April 7, 1959
J. R. HALL
2,881,255
MAGNETIC RECORDING SYSTEM
Filed Oct. 25, 1954
3 Sheets-Sheet 1
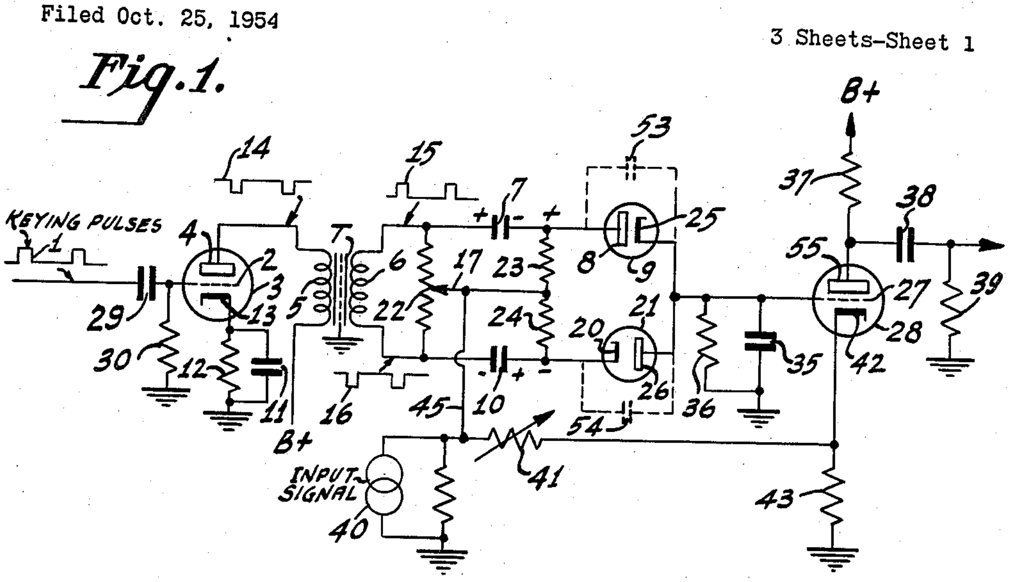
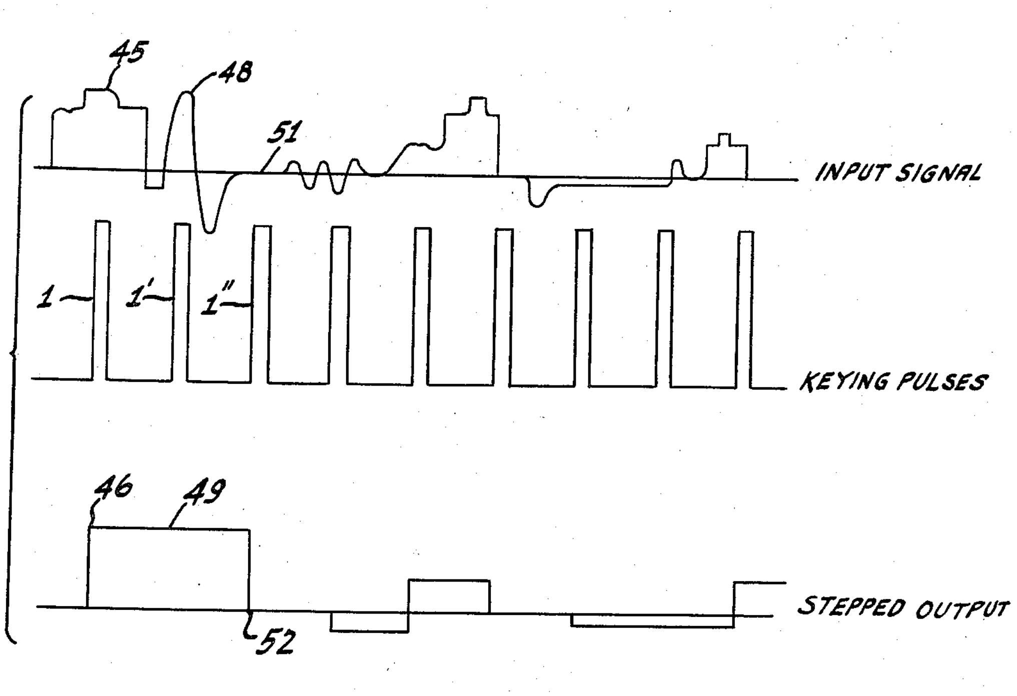
Fig.2.
INVENTOR.
JAMES R. HALL
BY Charles H. Brown
ATTORNEY INVENTOR.
JAMES R. HALL
BY Charles H. Brown
ATTORNEY INVENTOR.
JAMES R. HALL
BY Charles H. Brown
ATTORNEY

United States Patent Office 2,881,255

Patented Apr. 7, 1959

2,881,255

MAGNETIC RECORDING SYSTEM

James Robert Hall, Haddonfield, N.J., assignor to Radio Corporation of America, a corporation of Delaware Application October 25, 1954, Serial No. 464,264

7 Claims. (Cl. 179—15)

The invention relates to magnetic recording systems and particularly to sampler circuits suitable therefor.

Among the objects of the invention are: the provision of a sampling circuit that is capable of taking a narrow sample of the amplitude of a signal and producing a broad pulse of substantial maximum energy content for a given peak amplitude reasonably free of distortion and one that has the same relative sample amplitude as the instantaneous amplitude of the narrow sample; to minimize the error signal in the common output circuit of a time division multiplex system due to variation in amplitude of the individual sampled signals in the different channels; and to provide an improved balanced pulse sampler of low impedance which introduces negligible loss in signal level for the signals passing therethrough and possesses means to reduce undesired passage of input signals during non-sampling periods.

A feature of the invention is a balanced switching means for momentarily applying the signals to be sampled to a capacitor. The capacitor holds its charge for a relatively wide period of time compared with the momentary application of the signal. As the switching means continues to be driven, additional samples are applied to the capacitor. The charge on the capacitor is varied in accordance with the level of the voltage of the samples so as to maintain the same relative voltage that the signal had when applied by the switching means. By the applications of the signal, the capacitor holds its charge to produce a broadened pulse having the same relative amplitude as the signal when sampled. Due to the electrical characteristics of the switching means, a voltage change will occur at the output thereof even during periods of inoperativeness. Such a voltage change will vary the charge on the capacitor and produce an undesirable distortion of the broad pulse output which is determined in accordance with the charge on the capacitor. To minimize this distortion of the pulse output, a neutralizing circuit is included in the sampler and a relatively distortionless broad pulse output is obtained.

A more detailed description follows in conjunction with a drawing in which like reference numerals refer to like parts and in which:

Fig. 1 shows a circuit diagram of one embodiment of the invention;

Fig. 2 shows a series of waveforms given in an explanation of the operation of the circuit diagram of Fig. 1;

Figure 3:
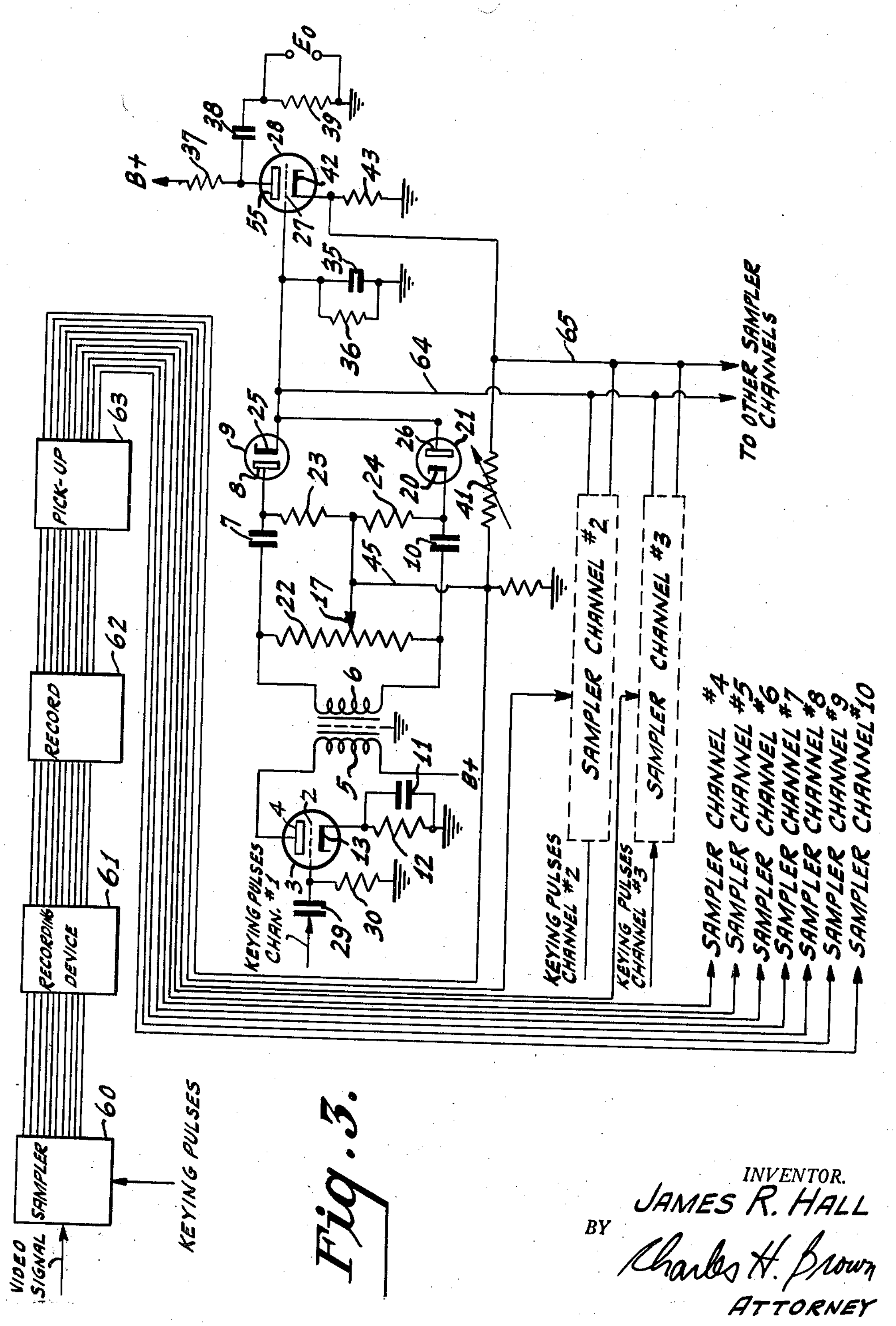
Fig. 3 shows a time division multiplex magnetic video system in which the system of Fig. 1 is especially useful.

Referring to Fig. 1, keying pulses 1 are coupled by means of capacitor 29 and resistor 30 to the grid 2 of an evacuated electron discharge device 3. The plate 4 of discharge device 3 is connected through the primary winding 5 of a low impedance transformer T to the positive terminal B+ of a source of unidirectional potential connected between the plate and ground. Cathode 13 of discharge device 3 is connected to a point of reference potential such as ground through an RC circuit composed of resistor 12 and capacitor 11. One terminal of the secondary winding 6 of the low impedance transformer T is connected through a capacitor 7 to the plate 8 of a diode 9. The other terminal of the secondary 6 is connected through a capacitor 10 to the cathode 20 of diode 21. A potentiometer 22 is connected across the secondary 6 of the low impedance transformer. Equal value resistors 23 and 24 are connected in series, the free end of resistor 23 being connected to plate 8 of diode 9 and the free end of resistor 24 being connected to cathode 20 of diode 21. The cathode 25 of diode 9 and the plate 26 of diode 21 are connected directly together and to the grid 27 of an evacuated electron discharge output device 28. An output capacitor 35 is connected between the grid 27 of output discharge device 28 and a point of reference potential such as ground. A resistor 36 is connected across the capacitor 35. The plate 55 of discharge device 28 is connected to positive terminal B+ through resistor 37. The output of the discharge device 28 is coupled to succeeding stages, not shown, by capacitor 38 and resistor 39. A source of input signals 40 is connected to the variable tap 17 of potentiometer 22 and to the junction of resistors 23 and 24. The source of input signals 40 is also connected through an impedance 41 to the cathode 42 of electron discharge output device 28. The cathode 42 is connected to a point of reference potential such as ground through resistor 43.

Keying pulses 1 are fed through discharge device 3, the output thereof 14 being fed through the primary 5 of low impedance transformer T. The transformer T is designed to pass the keying pulses without distorting them. The winding 6 should be balanced so that stray capacities through the point of reference potential are the same for both of its terminals and so that there is essentially no capacitive coupling to the winding 5. The keying pulses 1 are supplied at a repetition rate of desired sampling and of such a width as to sample the signal for the desired length of time. When the keying pulses 14 are applied to the primary 5, pulses of opposite polarity, 15 and 16, as shown in Fig. 1, will appear on the terminals of winding 6.

When the keying pulses 15 and 16 are first applied, current will flow through diodes 9 and 21 and capacitors 7 and 10 will be charged in the polarity shown in Fig. 1. Diodes 9 and 21 will be conductive but there will be a zero voltage supplied to output capacitor 35 in the absence of a signal voltage input from source 40. If the input signal from source 40 is now supplied to the sampler during the absence of a keying pulse therein, the diodes 9 and 21 being maintained nonconducting by the polarity of the charges on capacitors 7 and 10, there will be no passage of a signal voltage through the diodes and the output capacitor 35 will remain without a charge. It is important that the peak-to-peak voltage of the keying pulses, 15 and 16, be greater than the maximum peak-to-peak signal voltage from source 40, preferably twice as great. Because of the greater voltage level of the pulses, the diodes may be made to conduct during sampling periods, but remain nonconducting, due to the charge on capacitors 7 and 10 at the level of the keying pulses, during periods of no keying pulses, regardless of the polarity and strength of the voltage of the signal being sampled.

When the signal is fed through the sampler circuit and a keying pulse is simultaneously fed through the low impedance transformer T of the desired width and height, current will flow across resistors 23 and 24 in the polarity shown and the diodes will become conductive. When the diodes become conductive, output capacitor 35 is switched across the signal source 40 and is charged to the peak signal voltage occurring during the sampling time, the capacitors 7 and 10 being charged to the peak voltage of the keying pulses. Upon the removal of the keying pulses, capacitor 35 is disconnected from the signal source 40. Since the resistance of the discharge path of the output capacitor 35 through the back resistance of the diodes and through the electron discharge device 28 is very high, the capacitor 35 will hold this charge until the charge is changed to a new value by the application of additional keying pulses. Capacitors 7 and 10 and their respective charges applied across resistors 23 and 24 in series form a time constant of sufficient length to keep the diodes nonconducting until the next keying pulse is applied.

The charge on capacitor 35 will determine the voltage on the grid 27 of output discharge device 28 and, therefore, the signal output from the plate 55 of discharge device 28 will be in accordance with the charge on capacitor 35. By varying or changing the charge on the capacitor 35, by the diode switching means, a broad pulse output having the same relative amplitude as a narrow sample of a signal from source 40 is obtained.

A large resistance 36 is placed across the output capacitor 35 as a safety device to permit the gradual discharge of the capacitor 35 in the event of the failure or removal of the discharge devices or of the other components in the circuit.

Reference is made to the waveforms shown in Fig. 2 for an understanding of the operation of the system of Fig. 1. When the keying pulse 1 is supplied to discharge device 3 and, thereafter, as a positive and negative pulse, 15 and 16, to capacitors 7 and 10, respectively, the signal voltage is at the value 45. The sample 45, being positive in nature, capacitor 35 will be charged to the same value 46, the diodes 9 and 21 being made conductive by the keying pulse 1. Due to the high discharge path, the capacitor 35 will retain the charge until the next keying pulse 1′. During the next keying pulse 1′, the signal voltage is at the value 48. As the sample 48 is of the same voltage as sample 45, the output capacitor 35 will retain a similar equal value charge 49 until the next keying pulse 1″. During keying pulse 1″, the signal voltage is at the reduced value 51. The sample 51 being negative as compared to the preceding samples, the capacitor 35 will assume a new charge 52 in accordance with the voltage of the sample. The capacitor will retain this new charge until the next keying pulse when the charge will again be altered in accordance with the voltage level of the sample in a similar manner. The output of discharge device 28 in the form of broad pulses of the same characteristics as the charge on capacitor 35 may be coupled to such further circuits as may be desired.

Since the diode shunt capacitances 53 and 54 are not infinitely small, a capacitive voltage divider is formed consisting of the shunt stray capacities 53 and 54 shown in dotted lines and the output capacitor 35. As a result, a reduced value of the input signal is applied to the grid 27 of the output tube 28 even during nonconductive periods of the diodes 9 and 21. This feed-through is highly objectionable because the varying of the charge on the capacitor 35 by the feed-through signal serves to distort the broad pulse output. The percentage of error as between the broad pulse output and the signal input which has been sampled increases accordingly. It is necessary, therefore, to reduce this feed-through signal. This is done by a neutralizing circuit including a second voltage divider consisting of a cathode input impedance 43, a neutralizing impedance 41 and a connection 45 which applies a signal to the cathode 42 of the discharge output tube 28 which is in the same phase and amplitude as the undesired feed-through component applied to the grid 27. This results in a grid-cathode signal voltage of zero and reduces the feed-through signal in the output to an extremely small and negligible value. There will be a zero change in the plate current brought about by the signal being fed through the diodes during periods of nonconduction and a reasonably distortionless broad pulse output will result which is an accurate representation of the signal sampled by the keying pulses. The sample of the input signal will be converted to wide pulses of realized maximum energy for a given peak amplitude and maximum allowable pulse width. Such pulses are faithful representations of the input signal sampled. The information obtained, which is reasonably free of error due to negligible distortion of the input signal sampled by the sampler, may be utilized in arrangements for reconstituting the original signal, as discussed below.

Typical values of the component parts given by way of example are as follows:

| | |
|---|---|
| Discharge device **3** | ½6BQ7A. |
| Discharge device **28** | ½6BQ7A. |
| Diode **9** | ½6AL5. |
| Diode **21** | ½6AL5. |
| Resistor **30** | 100,000 ohms. |
| Resistor **12** | 200 ohms. |
| Resistor **23** | 100,000 ohms. |
| Resistor **24** | 100,000 ohms. |
| Resistor **36** | 1 megohm. |
| Resistor **37** | 2,700 ohms. |
| Resistor **39** | 600 ohms. |
| Potentiometer **22** | 250 ohms. |
| Impedance **41** | 4,700 ohms. |
| Impedance **43** | 330 ohms. |
| Capacitor **29** | 1,000 mmfds. |
| Capacitor **11** | 1,000 mmfds. |
| Capacitor **7** | .01 mfd. |
| Capacitor **10** | .01 mfd. |
| Capacitor **35** | 50 mmfds. |
| Capacitor **38** | 5 mfd. |

The keying pulses will have a repetition rate of approximately 1 mc., the bandwidth of a video input signal supplied from source 40, for example, being in the range of 0–5 mc.

With components having the above values used in Fig. 1, keying pulses having a duration of approximately 0.1 microsecond and of a frequency of approximately 1 mc. are sufficient to obtain outputs having an essentially constant amplitude for approximately 1.0 microsecond.

Fig. 3 shows the application of the invention for use at the playback end of a time division multiplex multichannel magnetic recording wide bandwidth video system where a very short time sample is taken from each channel and the samples are combined to reconstitute the original wide bandwidth video signal. In the recording of television signals on records such as magnetic tape, it has been found that the wide bandwidth of the television signals presents difficult problems for the recording equipment. In the utilization of a time division multiplex multi-channel magnetic recording video system in accordance with the present invention, the signal is divided into several component parts each having a greatly reduced bandwidth compared to that of the original signal. The component parts may be recorded by the use of standard apparatus and, as desired, recombined into the original video signal by reading the individual component parts off of the record and combining them in suitable circuits.

The video signal is fed into a sampler circuit 60 consisting of a plurality of balanced sampler channels, preferably of the type disclosed by this invention. In the particular circuit illustrated in Fig. 3 there are ten such channels deriving ten output signals representing the wideband video signal input. The same video signal is fed simultaneously to all samplers. The ten sampler channels are sequentially keyed from a source of keying pulses in the manner of a time division multiplex system. The ten signals will then be fed to a recording means 61 which will in turn record the information contained in each of the signals on ten spaced parallel tracks on a record such as a magnetic tape at stage 62. The recording means include individual magnetic recording heads adjacent the fast traveling tape. Because of the use of the time division principle, the tape or recording means need travel only one-tenth as fast as a magnetic video recording system not operating on this principle. When it is desired to recombine the ten individual signals into the original video signal a pickup arrangement 63 may be so arranged as to read the information off of the record, shown for purposes of illustration as 62. Each of the ten channels is then individually fed to the balanced and neutralized sampler of this invention. For purposes of illustration, only the circuit of channel 1 has been shown but it is to be understood that the other channel circuits shown in dotted line boxes are fed and arranged in the same manner. A common conductor 64 serves to connect the outputs of the different sampler channels to common output capacitor 35. A second common conductor 65 serves to connect the neutralizing impedance 41 in each of the ten sampler channels to cathode 42 of the output tube 28. It may be seen, therefore, that there is provided a multiplicity of low impedance signal sources, channels 1 to 10, each driving a common storage capacitor through an electronic switch consisting of two diodes.

In typical operation in a ten channel time division multiplex system, such as is shown in Fig. 3, the keying pulses are arranged to key the channels sequentially. That is, channel 1 is turned on for a period equal to or less than one-tenth of the period (T) between samples on any single channel. All channels have the same sampling rate and therefore the same period between samples. However, the keying pulses applied to channel 2 occur at a time ($t$) later than those applied to channel 1 and this time ($t$) is equal to one-tenth of the period (T). Similarly, channel 3 keying pulses are delayed relative to the keying pulses on channel 2. In this manner, each channel is keyed at a time later than its adjacent lower number channel. Channel 1 is again keyed after channel 10 and the cycle of operations repeats itself. Thus the rate at which information is placed on the common storage capacitor is ten times the rate that it is taken off any single channel or an equivalent increase in bandwidth of ten times compared to that of a single channel.

Figures 4A, 4B, 4C:
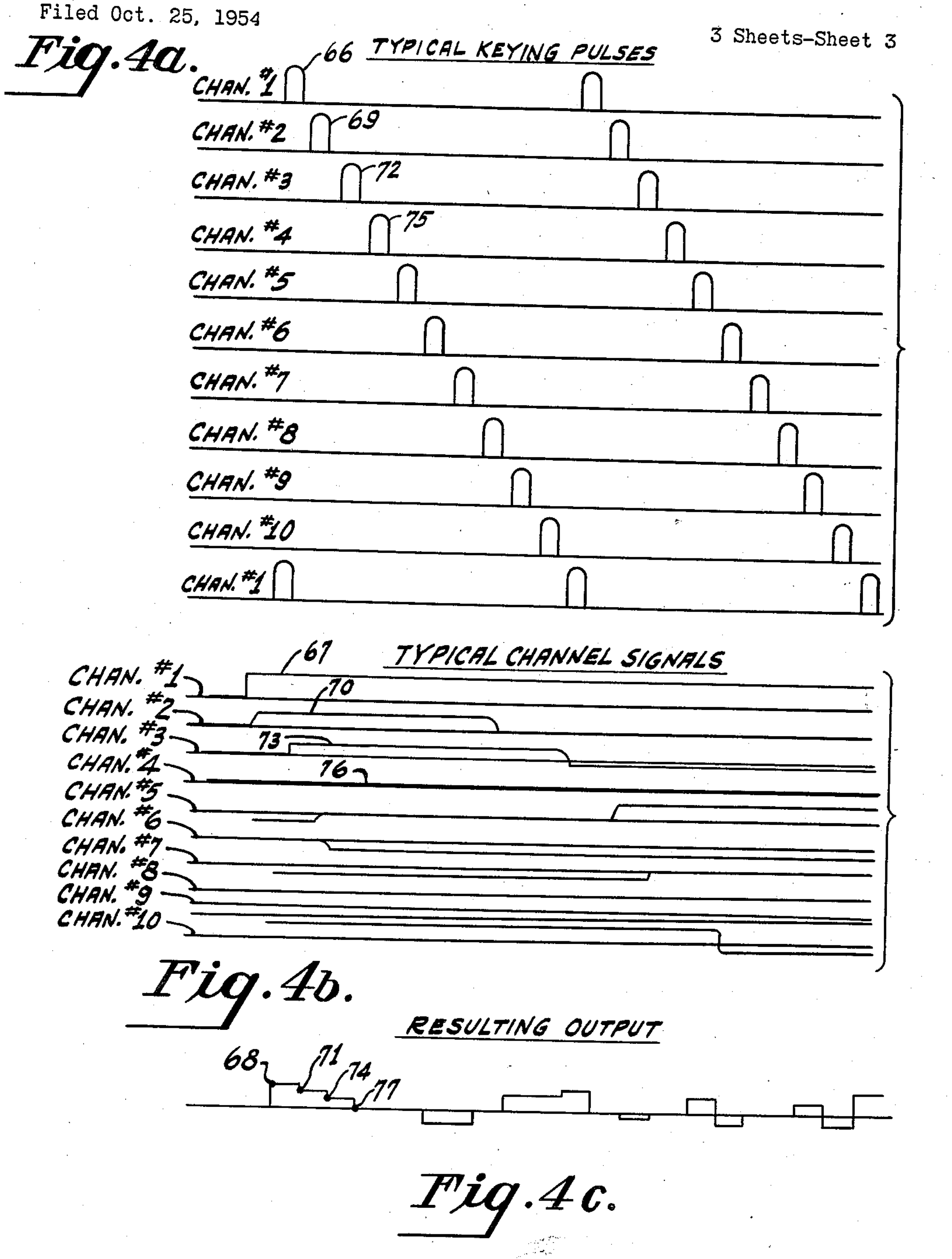
Figs. 4*a*, 4*b* and 4*c* show a series of waveforms given in an explanation of the operation of the circuit diagram of Fig. 3.

Figs. 4*a*, 4*b* and 4*c* disclose waveforms applicable to the circuit arrangement shown in Fig. 3, drawn on a common time abscissa or base. It is assumed that the signals appearing in the respective channels 1 to 10 on the record such as a magnetic tape are as shown in Fig. 4*b*. When keying pulse 66 is supplied to channel 1 the value of the sample of the input signal at channel 1 will be of a value 67. Capacitor 35 will be charged to the value 68 as shown in Fig 4*c*. The second keying pulse 69 will cause channel 2 sampler to become conductive. The sample of the input signal at channel 2 is of a value 70 which is less positive than sample 67 and the output capacitor 35 will be charged to this new value 71, as shown in Fig. 4*c*. When a third keying pulse 72 occurs, it will operate channel 3, the value of the voltage of the input signal at channel 3 being of the value 73 which is less positive than sample 70. The capacitor will charge to this new value 74. When the next pulse 75 occurs it will key channel 4. The input signal at channel 4 will be of a value 76. The output capacitor having maintained the previous charge brought about by keying pulse 72 on channel 3 will now be charged to the new value 76 of the input signal at channel 4 and the charge will appear as at 77 in Fig. 4*c* on the capacitor. As additional keying pulses are sequentially supplied to the sampler channels, the charge of the capacitor 35 will vary accordingly and a resulting output, as shown in Fig. 4*c*, will be obtained which will be the original wideband video signal appearing at the input to stage 60 in the time multiplex system.

By sequentially keying the sampler circuits in the manner disclosed, a wideband video signal may be reproduced that is reasonably free of distortion, due to the neutralizing circuit included in the sampler, and in which the percentage of error as to the original input signal is at a minimum. As the balanced pulse sampler arrangement is of low impedance throughout, there will be very little or no loss in signal level. Further, due to the fact that very little or none of the keying pulses will appear in the output, an error signal brought about thereby will not occur. A one percent variation in values of pulse heights would result in less than one percent error signal. Variations in width of the sampler output pulses will also produce an error signal related to the sampling frequency. However, the arrangement of the invention produces a step output and the width of the keying pulse will not cause a change in the step width which is only dependent on the spaces of the keying pulse from one channel to the next.

What is claimed is:

1. A sampler system comprising, in combination, a plurality of sampler channels, an output energy capacitor storage device connected in the output of and common to all of said channels, a source of keying pulses, means for simultaneously feeding a different input signal individually to each of said channels, means connected to said source to sequentially place said channels in a conducting condition in response to said keying pulses, each of said channels arranged upon being placed in said conducting condition to feed a sample of the voltage level of the input signal applied thereto to said storage device, said storage device being charged in turn to a level corresponding to the level of the voltage of each of said samples sequentially supplied thereto, a high resistance discharge path connected to said storage device, said storage device being operated to maintain a charge thereon at a level corresponding to the level of the voltage of a sample supplied thereto until the level of said charge is altered in accordance with the level of the voltage of a succeeding sample supplied to said storage device, the operation of said storage device producing a single output signal representative of the combined input signals fed to said channels, and means common to all of said sampler channels for neutralizing a variance in the level of the charge on said storage device by a signal fed through a sampler channel during the time said last-mentioned channel is maintained in a non-conducting condition.

2. Playback apparatus for a wideband magnetic video recording system comprising, in combination, a plurality of sampler channels, an output energy capacitor storage device connected in the output of and common to all of said channels, a source of keying pulses, means for simultaneously feeding a different input signal individually to each of said channels, means connected to said source to sequentially place said channels in a conducting condition in response to said keying pulses, each of said channels arranged upon being placed in said conducting condition to feed a sample of the voltage level of the input signal applied thereto to said storage device, said storage device being charged in turn to a level corresponding to the level of the voltage of each of said samples sequentially supplied thereto, a high resistance discharge path connected to said storage device, said storage device being operated to maintain a charge thereon at a level corresponding to the level of the voltage of a sample supplied thereto until the level of said charge is altered in accordance with the level of the voltage of a succeeding sample supplied to said storage device, the operation of said storage device producing a single output signal representative of the combined input signals fed to said channels, and means common to all of said sampler channels for neutralizing a variance in the level of the charge on said storage device by a signal fed through a sampler channel during the time it is maintained in a non-conducting condition.

3. A sampler circuit comprising, in combination, a first switching circuit including a first energy storage device and a first switching device responsive to a positive keying pulse to complete a first electrical path therethrough, said first storage device being arranged to maintain said first switching device inoperative and said first path incomplete in the absence of said positive pulse, a second switching circuit including a second energy storage device and a second switching device responsive to a negative keying pulse to complete a second electrical path therethrough, said second storage device being arranged to maintain said second switching device inoperative and said second path incomplete in the absence of said negative pulse, means for simultaneously applying a signal to the inputs of said first and second switching circuits, an output capacitor connected to the outputs of said first and second switching circuits, means to simultaneously apply said positive pulse to said first switching circuit and said negative pulse to said second switching circuit to cause upon said first and second paths being completed said output capacitor to be charged to a level determined according to the voltage level of said signal at the time of said pulses, a high resistance discharge path connected to said output capacitor, and means connected to said output capacitor and including an impedance voltage divider to neutralize any portion of said signal fed through said first and second switching circuits due to the electrical characteristics thereof during periods in which said first and second paths are incomplete.

4. A sampler circuit comprising, in combination, a first switching circuit including a first capacitor and a first diode responsive to a positive keying pulse to complete a first electrical path therethrough, said first capacitor being arranged to cause said first diode to remain non-conducting so as to maintain said first path incomplete in the absence of said positive pulse, a second switching circuit including a second capacitor and a second diode responsive to a negative pulse to complete a second electrical path therethrough, said second capacitor being arranged to cause said second diode to remain non-conducting so as to maintain said second path incomplete in the absence of said negative pulse, means for simultaneously applying a signal to the inputs of said first and second switching circuits, an output capacitor connected to the outputs of said first and second switching circuits, control means to simultaneously apply said positive pulse to said first switching circuit and said negative pulse to said second switching circuit to cause upon said first and second paths being completed said output capacitor to be charged to a level determined according to the voltage level of said signal at the time of said keying pulses, a high resistance discharge path connected to said output capacitor to maintain the charge thereon until the level of the charge is altered by a succeeding operation of said first and second diodes in response to a further positive and negative keying pulse supplied by said control means, and means connected to said output capacitor and including an impedance voltage divider to neutralize any portion of said signal fed through said first and second switching circuits due to the shunt capacities of said diodes during periods in which said first and second diodes are inoperative and said first and second paths are incomplete.

5. A sampler system comprising, in combination, a plurality of sampler channels, each of said channels comprising a first switching circuit including a first energy storage device and a first switching element responsive to a positive keying pulse to complete a first electrical path through said first circuit, said first device being arranged to maintain said first element inoperative and said first path incomplete in the absence of said positive pulse, and a second switching circuit including a second energy storage device and a second switching element responsive to a negative keying pulse to complete a second electrical path through said second circuit, said second device being arranged to maintain said second element inoperative and said second path incomplete in the absence of said negative pulse; means for simultaneously applying a different input signal individually to each of the inputs of said channels, an output energy capacitor storage device connected in common to the outputs of said first and second circuits in all of said channels, means to cause a positive pulse to be applied to said first circuit and simultaneously a negative pulse to be applied to said second circuit in first one and then another of said channels so that said channels are sequentially placed in a condition in which said first and second paths are completed, each of said channels arranged upon being placed in said condition to cause said output capacitor to be charged to a level determined according to a sample of the voltage level of the input signal applied thereto at the time of said positive and negative pulses, said output capacitor being charged in turn to a level corresponding to the voltage level of each of said samples sequentially supplied thereto, a high resistance discharge path connected to said output capacitor to maintain a charge on said output capacitor at a level corresponding to the last sample supplied thereto from one of said channels until the level of said charge is altered according to a succeeding sample supplied from a next one of said channels subsequently placed in said condition, the operation of said output capacitor combining said input signals into a single output signal for application to a utilization circuit, and means common to all of said channels for neutralizing a variance in the level of the charge on said output capacitor by a portion of one of said input signals being fed through a channel during the time that said first and second paths in said last-mentioned channel are maintained inoperative and incomplete.

6. Playback apparatus for a wideband magnetic video recording system comprising, in combination, a plurality of sampler channels, each of said channels comprising a first switching circuit including a first capacitor and a first diode responsive to a positive keying pulse to complete a first electrical path through said first circuit, said first capacitor being arranged to maintain said first diode inoperative and said first path incomplete in the absence of said positive pulse, and a second switching circuit including a second capacitor and a second diode responsive to a negative keying pulse to complete a second electrical path through said second circuit, said second capacitor being arranged to maintain said second diode inoperative and said second path incomplete in the absence of said negative pulse; means for simultaneously applying a different input signal individually to each of the inputs of said channels, an output energy capacitor storage device connected in common to the outputs of said first and second circuits in all of said channels, means to cause a positive pulse to be applied to said first circuit and simultaneously a negative pulse to be applied to said second circuit in first one and then another of said channels so that said channels are sequentially placed in a condition in which said first and second paths are completed, each of said channels being arranged upon being placed in said condition to cause said output capacitor to be charged to a level determined according to a sample of the voltage level of the input signal applied thereto at the time of said positive and negative pulses, said output capacitor being charged in turn to a level corresponding to the voltage level of each of said samples sequentially supplied thereto, a high resistance discharge path connected to said output capacitor to maintain a charge on said output capacitor at a level corresponding to the last sample supplied thereto from one of said channels until the level of said charge is altered according to a succeeding sample supplied from a next one of said channels subsequently placed in said condition, the operation of said output capacitor combining said input signals into a single output signal for application to a utilization circuit, and means common to all of said channels for neutralizing a variance in the level of the charge on said output capacitor by a portion of one of said input signals being fed through a channel during the time that said first and second paths in said last-mentioned channel are maintained inoperative and incomplete.

7. A wideband magnetic recording system of the type arranged to derive a number of narrow signals from a single input signal comprising, in combination, a plurality of sampler channels, each of channels comprising a first switching circuit including a first capacitor and a first diode responsive to a positive keying pulse to complete a first electrical path therethrough, said first capacitor being arranged to cause said first diode to remain non-conducting so as to maintain said first path incomplete in the absence of said positive pulse, a second switching circuit including a second capacitor and a second diode responsive to a negative pulse to complete a second electrical path therethrough, said second capacitor being arranged to cause said second diode to remain non-conducting so as to maintain said second path incomplete in the absence of said negative pulse, means for simultaneously applying a signal to the inputs of said first and second switching circuits, an output capacitor connected to the outputs of said first and second switching circuits, control means to simultaneously apply said positive pulse to said first switching circuit and said negative pulse to said second switching circuit to cause upon said first and second paths being completed said output capacitor to be charged to a level determined according to the voltage level of said signal at the time of said keying pulses, a high resistance discharge path connected to said output capacitor to maintain the charge thereon until the level of the charge is altered by a succeeding operation of said first and second diodes in response to a further positive and negative keying pulse supplied by said control means, and means connected to said output capacitor and including an impedance voltage divider to neutralize any portion of said signal fed through said first and second switching circuits due to the shunt capacities of said diodes during periods in which said first and second diodes are inoperative and said first and second paths are incomplete.

References Cited in the file of this patent

UNITED STATES PATENTS

| | | |
|---|---|---|
| 2,517,808 | Sziklai | Aug. 8, 1950 |
| 2,563,406 | Goldberg | Aug. 7, 1951 |
| 2,700,763 | Foin | Jan. 25, 1955 |
| 2,741,756 | Stocker | Apr. 10, 1956 |